US006745014B1

(12) United States Patent
Seibert et al.

(10) Patent No.: US 6,745,014 B1
(45) Date of Patent: Jun. 1, 2004

(54) COMMUNICATIONS INTERFACE FOR WIRELESS COMMUNICATIONS HEADSET

(75) Inventors: Marc A. Seibert, Medina, OH (US); Anthony Joseph Culotta, Jr., Merritt Island, FL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 637 days.

(21) Appl. No.: 09/631,155

(22) Filed: Jul. 31, 2000

Related U.S. Application Data

(60) Provisional application No. 60/162,089, filed on Oct. 28, 1999.

(51) Int. Cl.[7] .............................. H04B 1/40; H04B 1/38; H04M 1/00; H04M 7/04; H04M 9/00
(52) U.S. Cl. .................... 455/74.1; 455/74; 455/557; 455/560; 455/561; 379/398; 379/394
(58) Field of Search ................................. 455/462, 463, 455/464, 74, 507, 74.1, 41.2, 78, 79, 550.1, 552.1, 557, 560, 569.1, 559, 90.2, 561; 379/398, 394

(56) References Cited

U.S. PATENT DOCUMENTS

| | | | |
|---|---|---|---|
| 3,949,403 A | | 4/1976 | Yoshida et al. |
| 4,005,269 A | * | 1/1977 | Willis .......................... 455/561 |
| 4,119,800 A | * | 10/1978 | Girardi ........................ 455/410 |
| 4,384,260 A | | 5/1983 | Hornburg |
| 4,484,029 A | | 11/1984 | Kennedy |
| 4,500,752 A | | 2/1985 | Lee |
| 4,771,283 A | | 9/1988 | Imoto |
| 4,941,203 A | * | 7/1990 | Patsiokas et al. ............ 455/517 |
| 4,961,219 A | * | 10/1990 | Patel ........................... 379/398 |
| 5,220,685 A | | 6/1993 | Bradt et al. |
| 5,263,181 A | | 11/1993 | Reed |
| 5,473,685 A | * | 12/1995 | Mulder ........................ 379/394 |
| 5,649,307 A | * | 7/1997 | Patino ........................ 455/90.2 |
| 5,794,127 A | | 8/1998 | Lansang |
| 6,181,792 B1 | * | 1/2001 | Derby et al. ................. 379/398 |
| 6,311,052 B1 | * | 10/2001 | Lenz ........................... 455/305 |

* cited by examiner

Primary Examiner—Vivian Chin
Assistant Examiner—Raymond B. Persino
(74) Attorney, Agent, or Firm—Randall M. Heald; Gary G. Borda; Guy Miller

(57) ABSTRACT

A universal interface adapter circuit interfaces, for example, a wireless communications headset with any type of communications system, including those that require push-to-talk (PTT) signaling. The interface adapter is comprised of several main components, including an RF signaling receiver, a microcontroller and associated circuitry for decoding and processing the received signals, and programmable impedance matching and line interfacing circuitry for interfacing a wireless communications headset system base to a communications system. A signaling transmitter, which is preferably portable (e.g., handheld), is employed by the wireless headset user to send signals to the signaling receiver. In an embodiment of the invention directed specifically to push-to-talk (PTT) signaling, the wireless headset user presses a button on the signaling transmitter when they wish to speak. This sends a signal to the microcontroller which decodes the signal and recognizes the signal as being a PTT request. In response, the microcontroller generates a control signal that closes a switch to complete a voice connection between the headset system base and the communications system so that the user can communicate with the communications system. With this arrangement, the wireless headset can be interfaced to any communications system that requires PTT signaling, without modification of the headset device. In addition, the interface adapter can also be configured to respond to or deliver any other types of signals, such as dual-tone-multiple-frequency (DTMF) tones, and on/off hook signals. The present invention is also scalable, and permits multiple wireless users to operate independently in the same environment through use of a plurality of the interface adapters.

18 Claims, 4 Drawing Sheets

COMMUNICATIONS INTERFACE FOR WIRELESS COMMUNICATIONS HEADSET

CROSS REFERENCE TO RELATED APPLICATIONS

This application claims the benefit under 35 U.S.C. 119(e) of U.S. Provisional Application No. 60/162,089 filed Oct. 28, 1999.

ORIGIN OF THE INVENTION

The invention described herein was made in the performance of work under a NASA contract and by an employee of the United States Government and is subject to the provisions of Section 305 of the National Aeronautics and Space Act of 1958, as amended, Public Law 85-568 (72 Stat. 435, 42 U.S.C. §2457), and may be manufactured and used by or for the Government for governmental purposes without the payment of any royalties thereon or therefore.

BACKGROUND OF THE INVENTION

1. Field of the Invention

The present invention relates to a communications interface that enables wireless-communication headsets, or the like, to be used with various types of communications systems, without the need to modify the headsets or the communications system in use.

2. Description of the Background Art

Various types of portable communications devices are available to facilitate communication between field personnel and a central location. For example, during rocket launches, numerous personnel are stationed around the launch pad and they must be able to participate in voice communications from a command center. The personnel typically use centralized communications equipment for voice conferencing, portable radios or telephones for this purpose. Two types of portable radios or telephones are particularly suited for such an environment, these being wireless and hard wired communication headsets. In both cases, the units are wearable by the users so that the users can keep their hands free most or all of the time. Generally, wired headsets have a push-to-talk (PTT) device built-in that provides certain communications equipment with a keying signal during transmit. Thus, while a user can continuously hear the communications of others using the system, they must actuate a push button, or the like, when they want to talk on the system. This arrangement is especially desirable where a large number of users are communicating on a single channel, and substantially reduces extraneous background and other noise that would otherwise impede the clarity of the communications.

However, the cords from wired headsets physically cause problems, especially around sensitive flight hardware. Although this problem is solved by wireless headsets, known commercial off-the-shelf (COTS) wireless-communication headsets operate (transmit and receive) continuously, and are not designed to provide any special signaling such as PTT, or external "off hook" or "on hook." PTT information, for example, is required by many communications systems (especially modern digital systems) to trigger events in the system when the user "keys up" to participate in a voice conference or network, thus making continuous transmission wireless headsets incompatible with such systems.

Continuous transmission impacts analog and digital voice systems differently. In analog systems, amplifiers are continuously active which results in excessive power usage. In addition, inopportune noise is introduced into the voice networks by COTS wireless headsets interfaced to the networks. In digital systems, the operation of the central equipment is impacted while a switch in the equipment considers a wireless headset user as a "continuous talker" into the voice networks. Further, non-PTT communications devices are not even permitted to be used with some communication systems, such as those in use by Department of Defense agencies, law enforcement and public safety (including 911) call centers, air traffic controller operations environments, other mission critical communications environments and even commercial (telemarketing) call centers. In view of the desirability of using wireless headset type communications devices, a need therefore exists for enabling these devices to be used in applications requiring PTT or other signaling.

SUMMARY OF THE INVENTION

The present invention fulfills the foregoing need through provision of a universal interface adapter circuit that can, for example, interface a COTS wireless communications headset with any type of communications system, including those that require PTT or any other type of signaling. The interface adapter circuit is comprised of several main components, including an RF signaling receiver, and a decoder and control signal generator, that are preferably implemented with a microcontroller, for decoding signals received from the signaling receiver and processing the decoded signals. A programmable or configurable impedance matching and interfacing circuit is also provided for interfacing a COTS headset system base to a communications system. A signaling transmitter, which is preferably portable (e.g., handheld), is employed by the wireless headset user to send encoded signals to the signaling receiver. The signaling transmitter is preferably a low-power auxiliary radio transmitter that is in addition to the radio transmitter of the headset. This permits any one of a number of COTS brands and styles of headsets to be used with the invention interchangeably.

In an embodiment of the invention directed specifically to PTT signaling, the wireless headset user presses a button on the signaling transmitter when they wish to speak. This sends an encoded signal to the microcontroller that decodes the signal and recognizes the signal as being a PTT request. In response, the microcontroller generates a control signal that actuates a relay to close a switch and complete a voice connection between the headset system base and the communications system so that the user can communicate with the communications system. With this arrangement, the COTS wireless headset can be interfaced to any communications system that requires PTT signaling, without modification of a commercial headset device, or selection of a specific commercial wireless headset device. In addition, the interface adapter circuit can also or alternately be configured to respond to or deliver any other types of signals, such as dual-tone-multiple-frequency (DTMF) tones, and on/off hook signals. The present invention also permits multiple wireless users to operate independently in the same environment through use of a plurality of the interface adapter circuits.

BRIEF DESCRIPTION OF THE DRAWINGS

The features and advantages of the present invention will become apparent from the following detailed description of a number of preferred embodiments thereof, taken in conjunction with the accompanying drawings, in which.

DETAILED DESCRIPTION OF THE PREFERRED EMBODIMENTS

Figure 1:
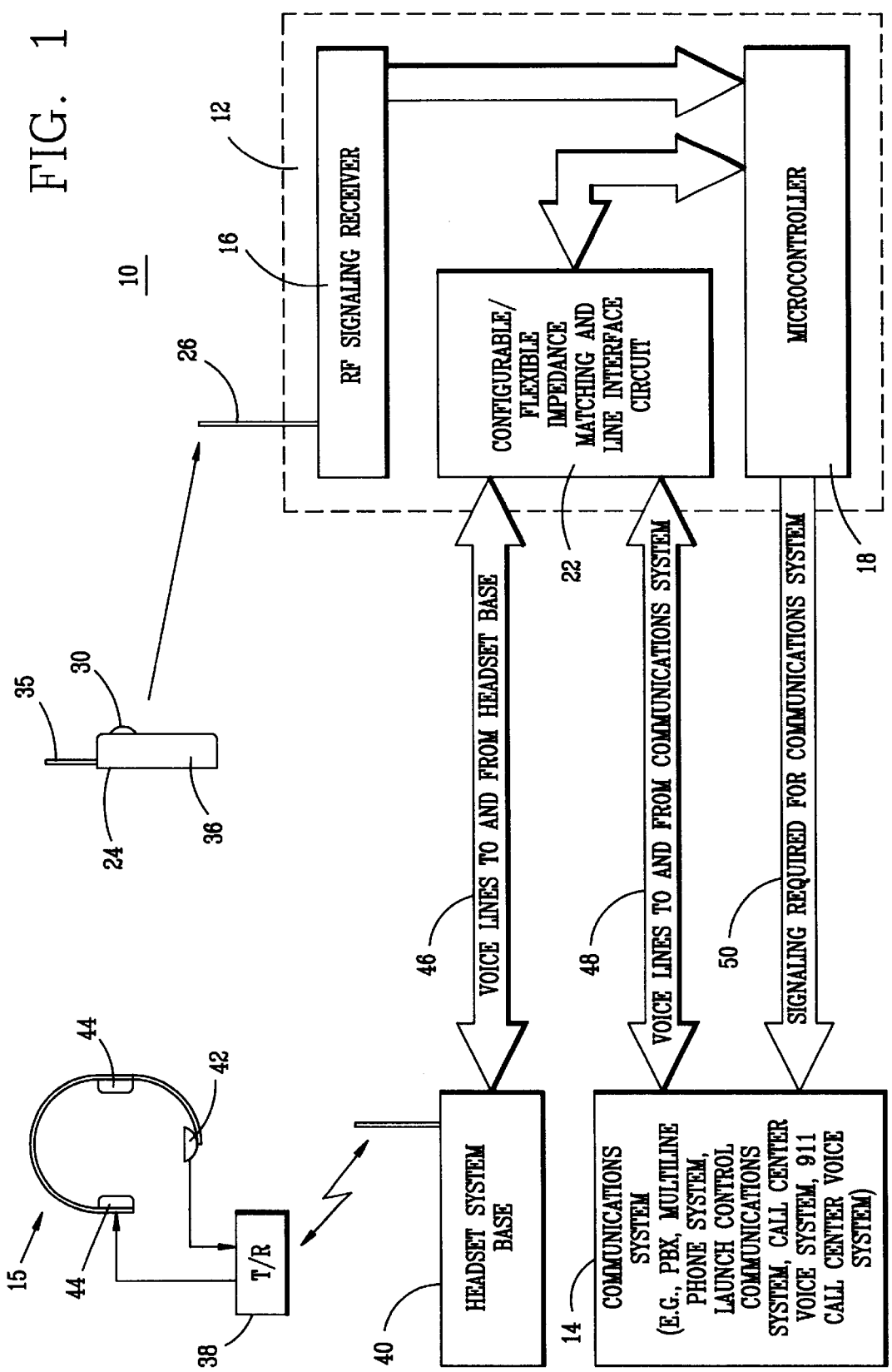
FIG. 1 is a schematic block diagram of a communications interface system that includes a universal interface adapter circuit that is constructed in accordance with a preferred embodiment of the present invention.

FIG. 1 is a block diagram of a communications interface system 10 that is configured in accordance with a first preferred embodiment of the present invention. The system 10 includes a universal interface adapter circuit 12 that is employed to interface a conventional communications system 14 to a communications device 15 that is not normally compatible with the communications system 14. The communications system 14 can be any type of conventional communications system including, but not limited to, PBX, multiline phone, launch control or other mission-critical communications, call center voice and 911 call center voice systems, for example. In the embodiment illustrated in FIG. 1, the communications device 15 is a commercial-off-the-shelf (COTS) wireless headset. However, it will be understood that the communications device 15 could be any type of communications device that requires special interfacing to be compatible with the communications system 14.

Figure 2:
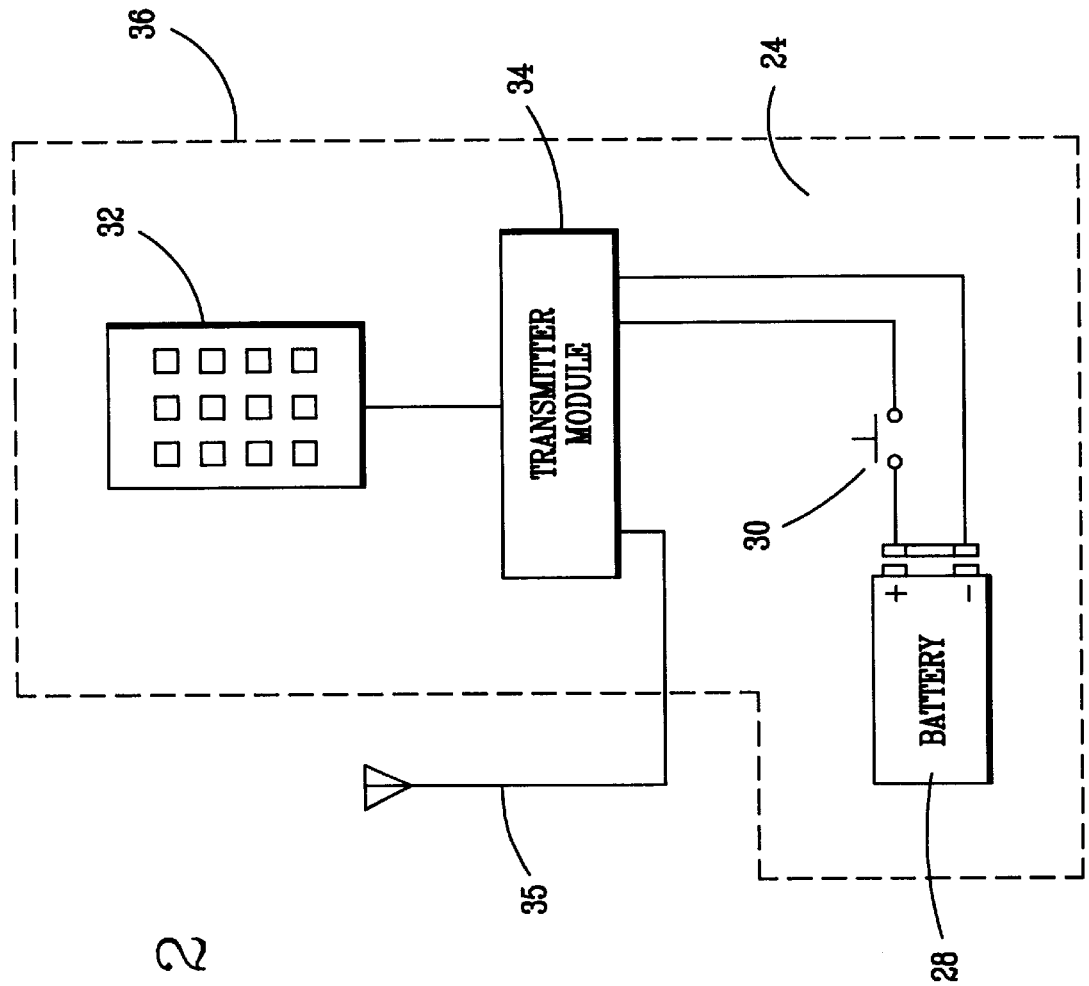
FIG. 2 is a schematic block diagram of a circuit for a portable transmitter that is preferably employed with the preferred embodiments.

The interface adapter circuit 12 includes an RF signaling (e.g., RS-422) receiver 16, which may be a MAX 485, for example, a microcontroller 18 that decodes signals received by the receiver 16 and generates control signals in response thereto, and a programmable or configurable/flexible impedance matching and line interfacing circuit 22 that is controlled by the microcontroller 18. The RF signaling receiver 16 receives encoded signals from a remote signaling transmitter 24 via a receiving antenna 26. Preferably, the microcontroller 18 comprises a microprocessor, however, it should be understood that the microcontroller 18 can be replaced by some other means, such as simple logic circuitry, that can perform the same signal decoding and control signal generation function. As illustrated in FIG. 2, the signaling transmitter 24 preferably is a portable hand held battery powered (preferably not greater than 12.0 VDC) device that includes a battery 28, a push button switch 30 and/or optional key pad 32 and a transmitter module 34 for generating and transmitting encoded signals to the universal interface adapter circuit 12 via an antenna 35. Preferably, the transmitter module 34 operates in the 900-MHz industrial, scientific and medical (ISM) frequency band so that minimal (if any) interference with the headsets, or other equipment should be experienced. The transmitter 24 is optionally housed in an environmentally sealed enclosure 36 for use in hazardous areas or outdoors.

In a preferred embodiment of the invention designed specifically for generating push-to-talk (PTT) signals, the push button switch 30 acts to send a signal to the transmitter module 34 which in turn, generates an encoded PTT signal that is transmitted to the signaling receiver 16 in the universal interface adapter circuit 12. The optional keypad 32 can be employed for generating other types of signals, such as dual-tone-multiple-frequency (DTMF) tones and off-hook signals, etc. It will be understood that any other type of switching mechanism can also be employed for generating the signals, and that the push button switch 30 and keypad 32 are examples of such mechanisms. The signals that are received from the signaling transmitter 24 by the signaling receiver 16 are fed to the microcontroller 18 to be decoded and used to generate control signals.

In the embodiment illustrated in FIG. 1, the signaling transmitter 24 is employed by a user of the COTS wireless headset 15. As is conventional, the wireless headset 15 includes a transceiver 38 for full duplex voice communications with a headset system base 40. The transceiver 38 transmits voice inputs from a microphone 42 to an antenna 43 of the headset system base 40, and receives audio signals from the headset system base 40 to power a pair of headphones 44. In a conventional system that does not employ the interface adapter circuit 12, the headset system base 40 would be hard wired directly to the communication system 14, and the audio circuits for both transmitting audio signals to, and receiving audio signals from, the headset 15 would be continually activated. This arrangement cannot, however, be employed with certain types of communication systems that require PTT signaling and many communications systems are not directly compatible with many COTS headsets. In such systems, the audio circuits for receiving audio signals from the wireless headset 15 can be activated only when the wireless headset user is talking.

The interface adapter circuit 12 interfaced between the headset system base 40 and the communications system 14 provides this functionality. In particular, a first plurality of voice lines 46 connect the headset system base 40 to the impedance matching and line interface circuit 22. In addition, a second plurality of voice lines 48 connects the communications system 14 to the impedance matching and line interface circuit 22, while one or more signaling lines 50 connect the microcontroller 18 to the communications system 14 for transmitting control signals. The impedance matching and line interface circuit 22 is programmable by the microcontroller 18, and may have its impedance adjusted to match the impedance of the particular communications system 14 with that of the headset system base 40. As will be discussed in greater detail in conjunction with FIG. 4, the microcontroller 18 can also control the connection of selected ones of the voice lines 46 and 48 through the impedance matching and line interface circuit 22. It should also be noted that interface adapter circuit 12 can be integrally formed with the communications system 14.

Figure 3:
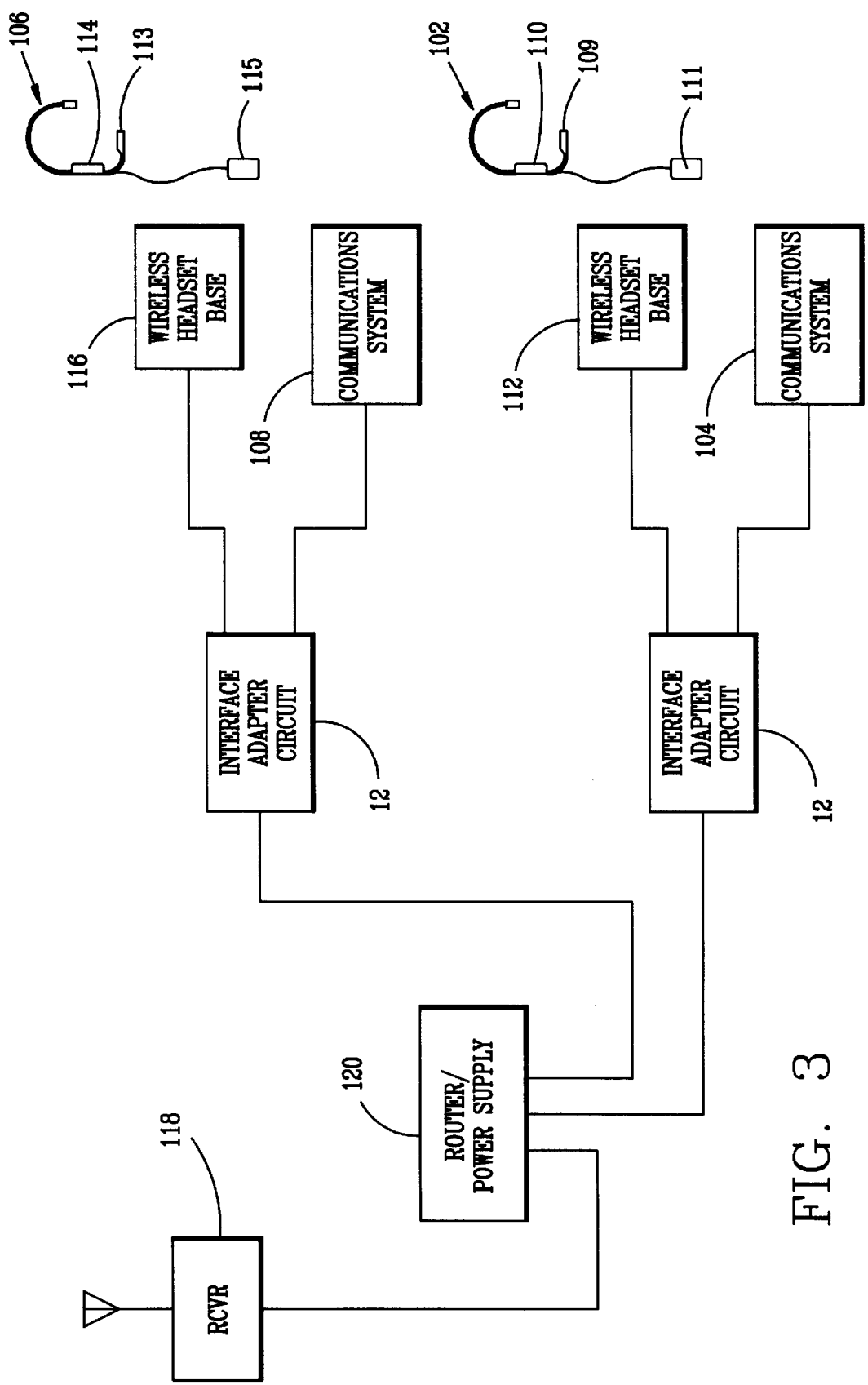
FIG. 3 is a schematic block diagram of a communications interface system that is constructed in accordance with another preferred embodiment of the present invention, and is configured for using multiple wireless headsets.

With reference to FIG. 3, another embodiment of the present invention is illustrated, this one being specifically designed for facilitating communications between a pair of wireless headsets and a pair of corresponding communications systems. Even though FIG. 3 is shown with only two users, the same concepts can be scaled to support any number of users. More particularly, a communications system interface 100 is illustrated in which two of the interface adapter circuits 12 are employed, one to facilitate communications between a first COTS wireless headset 102 and a first communications system 104, and a second to facilitate communications between a second COTS wireless headset 106 and a second communications system 108. The first wireless headset 102 includes a microphone 109, headphones 110 and a transceiver 111 that communicates with a first headset system base 112, while the second wireless headset 106 includes a microphone 113, headphones 114 and transceiver 115 that communicates with a second headset system base 116. A first of the portable signaling transmitters 24 shown in FIG. 2 is associated with the first wireless headset 102, and sends signals on a first channel to a two channel signaling receiver 118. Similarly, a second of the signaling transmitters 24 is associated with the second wireless headset 106, and sends signals on a second channel to the two channel signaling receiver 118. The signaling receiver 118 delivers the signals received on both channels to a combination control signal router and power supply 120, which separates the control signals by channel, and delivers the appropriate signals to each of the interface adapter circuits 12 for processing.

Figure 4:
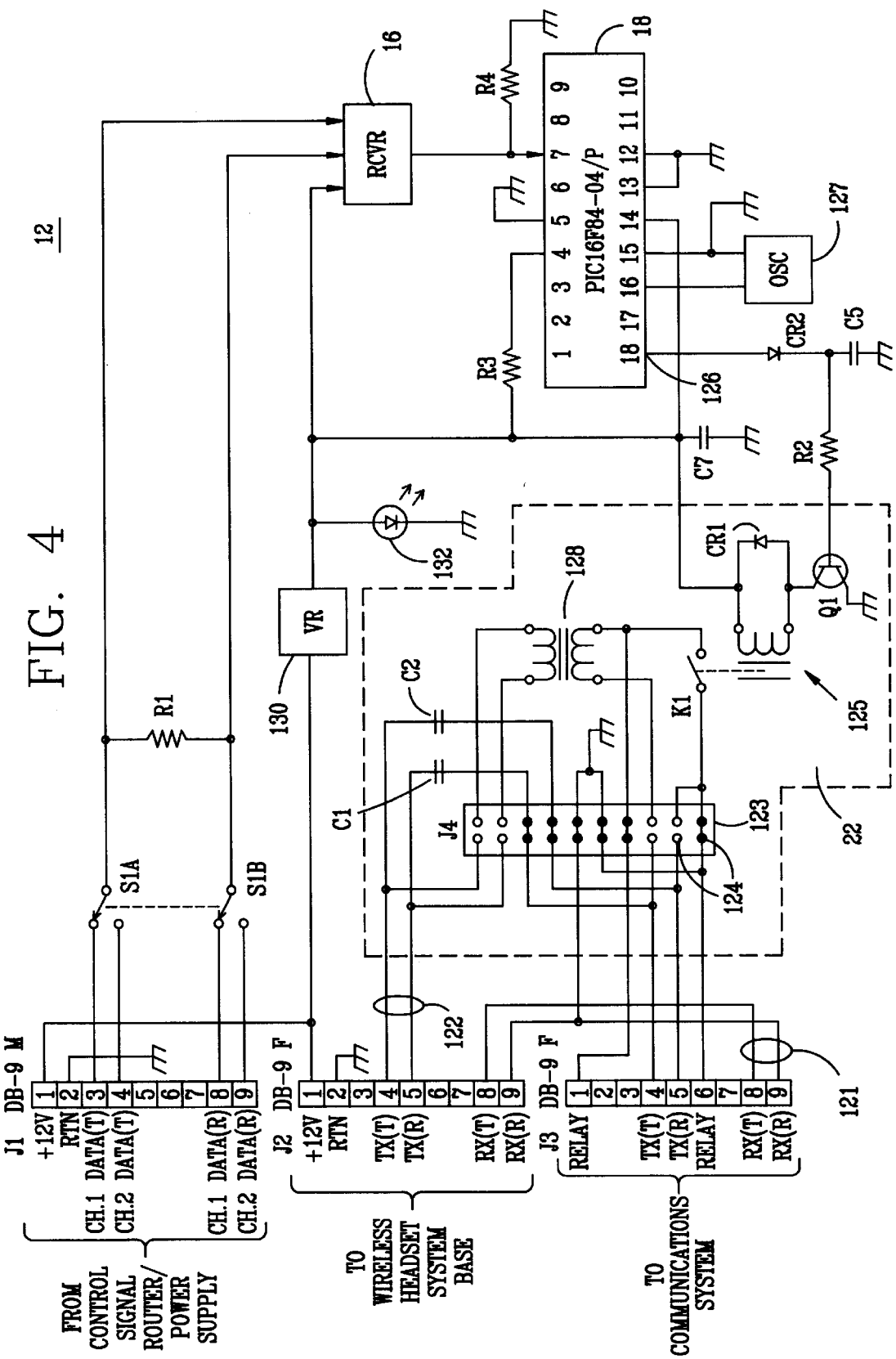
FIG. 4 is a schematic block diagram of the detailed circuitry employed in the universal interface adapter circuit used in the preferred embodiment of FIG. 3.

With reference now to FIG. 4, a specific circuit implementation of one of the interface adapter circuits 12 for use with the multiple user embodiment of FIG. 3 is illustrated. It should also be noted that this circuit implementation can also be used with the single user embodiment of FIG. 1. The wireless headset system base 112 or 116 is connected to a connector J2, and the communications system 104 or 108 is connected to a connector J3. Wireless PTT signals or other control signals are received from the control signal router/power supply 120 via a connector J1. Power for the interface adapter circuit 12 also enters the circuit via the connector J1. First and second data channel select switches S1A and S1B select which of the wireless data channel sources (portable transmitters 24) will be used for this interface adapter circuit 12. It should be noted that these switches would not be necessary for the single transmitter embodiment of FIG. 1. A resistor R1 sets the impedance of the balanced differential RS-422 received signals from the control signal router and power supply 120 and improves the capability of the RS-422RF receiver 16 to receive signals from the control signal router and power supply 120 clearly.

Two-wire voice signals originating in the communications system 104 or 108 enter through the connector J3 and pass-through the interface adapter circuit 12 untouched to the connector J2 via a pair of lines 121. Two-wire voice signals originating from the wireless headset microphone 109 or 113, however, enter the interface adapter circuit 12 from the headset system base 112 or 116 through the connector J2 via a pair of wires 122 that terminate at a programming terminal block 123 within the impedance matching and line interface circuit 22. The programming terminal block 123 includes a plurality of terminals 124 that allow the configuration of the impedance matching and line interface circuit 22 to be programmed as desired. In particular, external electrical components, such as wires, resistors, capacitors, circuit cards, etc., can be connected across selected ones of the terminals 124 to provide the interface functionality that is required for any given application. First and second capacitors C1 and C2 are used to remove undesired signal components from the voice signals passing to the impedance matching and interface circuit 22.

In this embodiment, the microcontroller 18 is preferably a 16-bit microprocessor, such as a model PIC 16F84-04/P, and receives encoded signaling messages from the signaling receiver 16 through the connector J1. The microcontroller 18 decodes the received signaling messages and sends control signals to the impedance matching and line interfacing circuit 22. For example, if the encoded message from the control signal router and power supply 120 is a "PTT" request message, the microcontroller 18 issues a voltage out to a relay 125 through an output port 126 (pin 18) to initiate a switch closure. More particularly, the voltage output passes into the base of a transistor Q1 to bias the same, which initiates a flow of electrons through the relay 125. As energy flows through the relay 125, a magnetic field closes a switch K1, thereby connecting the microphone voice lines from the wireless headset base 112 or 116 to the communications system 104 or 108 via the connector J3. The closure of the relay 125 also simultaneously causes sending of a signal to close another relay circuit (not shown) in the communications system 104 or 108, thus telling the communications system 104 or 108 that the "PTT" message was issued by the wireless headset user. Another message from the control signal router and power supply 120 reverses the operation in the interface adapter circuit 12, opening the microphone voice line from the wireless headset base 112 or 116 and opening the relay circuit from the communications system 104 or 108.

Numerous other circuit components are illustrated in FIG. 4 that serve various, secondary functions. These include a diode CR2 which guarantees that current leaving the output port is unidirectional to prevent damage to the microcontroller 18. A capacitor C5 ensures that a stable DC current is retained across a resistor R2 and the transistor Q1. A diode CR1 in the relay 125 provides a safe electrical flow back point for quiescent currents experienced after Q1 becomes unbiased. A resistor R3 buffers the "master clear" function of the microcontroller 18 upon microprocessor power-up. A resistor R4 is a pull-down resistor used to ensure that the port B input on the microcontroller 18 is set to a "low" state (zero volts DC) when the output of the RS-422 receiver 16 is "floating" (i.e., not a clear logic signal). A crystal oscillator 127 provides a reliable clock source for the microcontroller 18. A capacitor C7 ensures a stable positive supply voltage for logic comparisons within the microcontroller 18, and a stable source supply for the relay 125. An isolation transformer 128 is provided to couple transmit audio to J3 and provide a return current path to the communications system if required. A voltage regulator 130 provides regulated DC power to the low power RS-422 receiver 16. Finally, an LED 132 illuminates at all times when the interface adapter circuit 12 circuit is powered and operational.

In conclusion, the universal interface adapter circuit 12 can be used to interface a COTS wireless communications headset, or any other type of communication device, with any type of communications system, including those that require PTT or any other type of signaling. This is made possible by the microcontroller 18 and the impedance matching and line interfacing circuit 22 that enables selective programming or configuration of the interface adapter circuit 12 to accommodate any type of communications system requirements. In addition, the provision of the portable signaling transmitter 24 for sending selective control signals to the microcontroller 18 permits any one of a number of COTS brands and styles of headsets, or other communication devices, to be used with the invention interchangeably.

Although the invention has been disclosed in terms of a number of preferred embodiments and variations thereon, it will be understood that numerous additional variations and modifications could be made without departing from the scope of the invention as defined in the following claims.

We claim:

1. A communications interface system for facilitating communications between a communications system and a communication device comprising:
    a) a signaling transmitter for generating and transmitting encoded signals; and
    b) an interface adapter circuit for interfacing a communications system with a communication device, said interface adapter circuit including:

1) a signaling receiver for receiving said encoded signals from said signaling transmitter;
2) a decoder and control signal generator for decoding said received signals and generating control signals in response thereto;
3) an impedance matching and line interface circuit for interfacing a communications system to a communication device, said impedance matching and line interface circuit being controllable in response to said control signals; and
said impedance matching and line interface circuit including a programming terminal block including a plurality of terminals for selectively connecting one or more external electrical components to said circuit for selectively programming said impedance matching and line interface circuit.

2. The communications interface system of claim 1, wherein said signaling transmitter includes a transmitter module and a switch connected to said module for causing said module to transmit an encoded signal.

3. The communications interface of claim 2, wherein said signaling transmitter further includes a keypad connected to said module for causing said module to transmit a plurality of different encoded signals.

4. The communications interface system of claim 1, wherein said decoder and control signal generator generates a push-to-talk control signal in response to receipt of an encoded signal from said transmitter, and said impedance matching and line interface circuit further includes a switch for selectively connecting one or more voice lines from a communication device to a communications system in response to said push-to-talk control signal.

5. The communications interface system of claim 4, further including:
c) a wireless headset communication device;
d) a wireless headset base for sending voice communications to, and receiving voice communications from, said wireless headset communication device, said base being interfaced to said adapter interface circuit; and
e) a communications system interfaced to said adapter interface circuit;
whereby, said signaling transmitter sends a push-to-talk request to said receiver in said adapter interface circuit, and said decoder and control signal generator generates a push-to-talk control signal so that said switch in said impedance matching and line interface circuit will connect one or more voice lines from said wireless headset base to said communications system in response to said push-to-talk request.

6. The communications interface system of claim 1, wherein said decoder and control signal generator comprises a microcontroller.

7. The communications interface system of claim 1, wherein said decoder and signal generator comprises a microcontroller that generates a push-to-talk control signal in response to receipt of an encoded signal from said transmitter, and said impedance matching and line interface circuit further includes a programming terminal block including a plurality of terminals for selectively connecting one or more external electrical components for selectively programming said impedance matching and line interface circuit, and a switch for selectively connecting one or more voice lines from a communication device to a communications system in response to said push-to-talk control signal, and said interface system further includes:
c) a wireless headset communication device;
d) a wireless headset base for sending voice communications to. And receiving voice communications from, said wireless headset communication device, said base being interfaced to said adapter interface circuit; and
e) a communications system interfaced to said adapter interface circuit:
whereby, said signaling transmitter sends a push-to-talk request to said receiver in said adapter interface circuit, and said decoder and control signal generator generates a push-to-talk control signal so that said switch in said impedance matching and line interface circuit will connect one or more lines from said wireless headset base to said communications system in response to said push-to-talk request.

8. A communications interface system for facilitating communications between a plurality of communications systems and a plurality of communication devices comprising:
a) first and second communications systems;
b) first and second communication devices:
c) first and second signaling transmitters for generating and transmitting encoded signals, said first signaling transmitter being assigned to a first transmission channel, and said second signaling transmitter being assigned to a second transmission channel;
d) a first interface adapter circuit for interfacing said first communications system with said first communication device, said first interface adapter circuit including:
1) a signaling receiver for receiving said encoded signals from said first signaling transmitter;
2) a decoder and control signal generator for decoding said received signals and generating control signals in response thereto; and
3) an impedance matching and line interface circuit for interfacing said first communications system to said first communications device, said impedance matching and line interface circuit being controllable in response to said control signals; and
e) a second interface adapter circuit for interfacing said second communications system with said second communication device, said second interface adapter circuit including:
1) a signaling receive for receiving said encoded signals from said second signaling transmitter;
2) a decoder and control signal generator for decoding said received signals and generating control signals in response thereto; and
3) an impedance matching a line interfacing circuit for interfacing said second communications system to said second communications device, said impedance matching and line interface circuit being controllable in response to said control signals.

9. The communications interface system of claim 8, wherein said signaling transmitters each include a transmitter module and a switch connected to said module for causing said module to transmit an encoded signal.

10. The communications interface system of claim 8, wherein said signaling transmitter further includes a keypad connected to said module for causing said module to transmit a plurality of difference encoded signals.

11. The communications interface system of claim 8, wherein each of said decoding and controlling signal generators generates a push-to-talk control signal in response to receipt of an encoded signal from said transmitter, and each of said impedance matching and line interface circuits further includes a switch for selectively connecting one or more lines from a corresponding one of said communication devices to a corresponding one of said communications system in response to said push-to-talk control signal.

12. The communications interface system of claim 11, wherein said communication devices comprises first and second wireless headset communication devices and first and second corresponding wireless headset bases for sending voice communications to, and receiving voice communications from, said wireless headset communication devices, said bases interfaced to said first and second adaptor interface circuits, respectively;

whereby, said signaling transmitters send push-to-talk requests to said receivers in said adapter interface circuits, and said decoder and control signal generators generate push-to-talk control signals so that said switches in said impedance matching and line interface circuits will connect one or more voice lines from said wireless headset bases to said communications systems in response to said push-to-talk requests.

13. The communications interface system of claim 8, wherein said decoder and signal generators each comprise a microcontroller.

14. The communications interface system of claim 8, wherein each said impedance matching and line interface circuit includes a programming terminal block including a plurality of terminals for selectively connecting one or more external electrical components to said impedance matching and line interface circuits for selectively programming said circuits.

15. The communication interface system of claim 8, wherein each said decoder and generator comprises a microcontroller that generates a push-to-talk control signal in response to receipt of an encoded signal from a corresponding one of said transmitters, and each said impedance matching and line interface circuit further includes a programming terminal block including a plurality of terminals for selectively connecting one or more external electrical components to said impedance matching and line interface circuits for selectively programming said circuits, and a switch for selectively connecting one or more voice lines from a corresponding one of said communication devices to a corresponding one of said communications systems in response to said push-to-talk control signals, and wherein said communication devices comprise first and second wireless headset communication devices and first and second corresponding wireless headset bases for sending voice communications to, and receiving voice communications from, said wireless headset communication devices, said bases being: interfaced to said first and second adapter interface circuits, respectively;

whereby, said signaling transmitters send push-to-talk requests to said receivers in said adapter interface circuits, and said decoder and control signal generators generate push-to-talk control signals so that said switches in said impedance matching and line interface circuits will connect or more voice lines from said wireless headset bases to said communications systems in response to said push-to-talk requests.

16. A method for facilitating communications between a communications system and a communication device comprising the steps of a) providing a user of said communication device with a signaling transmitter for generating and transmitting encoded signals;

b) providing an interface adapter circuit for interfacing said communications system with said communication device, said interface adapter circuit including an impedance matching and line interface circuit for interfacing said communications system to said communication device;

c) generating and transmitting an encoded signal with said signaling transmitter;

d) receiving said encoded signal with a signaling receiver in said interface adapter circuit;

e) decoding said encoded signal and generating a control signal in response thereto;

f) employing said control signal to control said impedance matching and line interface circuit and facilitate communication between said communications system and said communication device; and g) providing a programming terminal block in said impedance matching and line interface circuit, said block including a plurality of terminals; and selectively connecting one or more external electrical components to said terminals for selectively programming said impedance matching and line interface circuit.

17. The method of claim 16, wherein said steps of decoding said encoded signal and generating a control signal in response thereto, and employing said control signal to control said impedance matching and line interface circuit further comprise generating a push-to-talk control signal, and applying said push-to-talk control signal to a switch in said impedance matching and line interface circuit for selectively connecting one or more voice lines from said communication device to said communications system in response to said push-to-talk control signal.

18. The method of claim 17, wherein said communication device comprises a wireless headset communication device, and a wireless headset base for sending voice communications to, and receiving voice communications from, said wireless headset communications device, said wireless base being interfaced to said adapter interface circuit.

* * * * *